(12) United States Patent
Roberge

(10) Patent No.: US 11,839,186 B2
(45) Date of Patent: Dec. 12, 2023

(54) MODULAR CONTAINER FOR GROWING PLANTS

(71) Applicant: CNH Industrial Canada, Ltd., Saskatoon (CA)

(72) Inventor: Martin J. Roberge, Saskatoon (CA)

(73) Assignee: CNH INDUSTRIAL CANADA, LTD., Sask (CA)

(*) Notice: Subject to any disclaimer, the term of this patent is extended or adjusted under 35 U.S.C. 154(b) by 87 days.

(21) Appl. No.: 17/544,067

(22) Filed: Dec. 7, 2021

(65) Prior Publication Data

US 2023/0172117 A1 Jun. 8, 2023

(51) Int. Cl.
*A01G 9/02* (2018.01)
*A01G 9/08* (2006.01)

(52) U.S. Cl.
CPC ...................... *A01G 9/02* (2013.01)

(58) Field of Classification Search
CPC ........ A01G 9/02; A01G 9/028; A01G 31/045; A01G 9/027; A01G 9/0295; A01G 9/085; A01G 9/086; A01G 31/00; A01G 31/02; A01G 7/04; A01G 7/045; A01G 9/20; A01G 9/1423; A01G 9/08; A01G 18/64
USPC ....... 104/140, 242, 244, 245, 307; 238/10 E, 238/10 F; 105/148, 155
See application file for complete search history.

(56) References Cited

U.S. PATENT DOCUMENTS

| | | | |
|---|---|---|---|
| 7,867,759 B2 | 1/2011 | Teixeira | |
| 9,288,948 B2 | 3/2016 | McNamara et al. | |
| 10,219,447 B1 | 3/2019 | Decarli et al. | |
| 2013/0185993 A1* | 7/2013 | Garrett | A01G 9/02 47/20.1 |

(Continued)

FOREIGN PATENT DOCUMENTS

| | | | | |
|---|---|---|---|---|
| KR | 20220157104 A | * | 11/2022 | ............... A01G 9/02 |
| WO | WO 2019157598 | | 8/2019 | |

(Continued)

OTHER PUBLICATIONS

CityCrop, Automated Indoor Farming, Rethinking Home Growing, product information page, dated 2020—5 pages https://www.citycrop.io/how-it-works/.

(Continued)

*Primary Examiner* — Joshua D Huson
*Assistant Examiner* — Spencer T Callaway
(74) *Attorney, Agent, or Firm* — Rebecca Henkel; Rickard DeMille

(57) ABSTRACT

A container for growing plants includes a bottom wall, a first side wall extending perpendicular to the bottom wall, and a second side wall extending perpendicular to the bottom wall and parallel to the first side wall such that the bottom wall, the first side wall, and the second side wall at least partially define a plant growing chamber. Furthermore, the container includes a lid configured to selectively occlude access to the plant growing chamber. Additionally, the container includes a carrier assembly positioned with the plant growing cham- (Continued)

ber and movably coupled to the first side wall and the second side wall. Moreover, the container includes a tool coupled to the carrier assembly such that movement of the carrier assembly relative to the first side wall and the second side wall moves the tool within the plant growing chamber.

19 Claims, 5 Drawing Sheets

(56) References Cited

U.S. PATENT DOCUMENTS

| | | |
|---|---|---|
| 2014/0279181 A1 | 9/2014 | Wills |
| 2019/0261577 A1 | 8/2019 | Burford |
| 2021/0137028 A1* | 5/2021 | Zelkind .................. B65G 1/137 |

FOREIGN PATENT DOCUMENTS

| | | | |
|---|---|---|---|
| WO | WO 2020154767 | 8/2020 | |
| WO | WO-2022027964 A1 * | 2/2022 | ............. A01G 27/00 |

OTHER PUBLICATIONS

Heliponix, GroPod Smart Garden, product information page, dated 2020—5 pages https://gropod.io/products/gropod.
Biopod, How Biopod Works, product information page, dated 2021—3 pages https://www.biopod.com/learn/.
FactoryPure, Dealzer Cash Crop 6.0 2 Plant LED Hydroponics Grow Box New—9 pages https://factorypure.com/products/dealzer-cash-crop-6-0-2-plant-led-hydroponics-grow-box-new.

* cited by examiner

MODULAR CONTAINER FOR GROWING PLANTS

FIELD OF THE INVENTION

The present disclosure generally relates to containers for growing plants and, more particularly, to a modular container for growing plants.

BACKGROUND OF THE INVENTION

As the world's population has increased and the amount of land available for farming has decreased, new farming techniques have been developed. One such technique is to grow crops or other plants within an urban area. In general, such farming operations use containers in which crops or other plants are grown. Specifically, these containers provide a suitable environment for growing crops in an area in which it would otherwise be difficult to grow crops (e.g., in a city). While such systems work well, additional improvements are needed.

Accordingly, an improved container for growing plants would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a container for growing plants. The container includes a bottom wall, a first side wall extending perpendicular to the bottom wall, and a second side wall extending perpendicular to the bottom wall and parallel to the first side wall such that the bottom wall, the first side wall, and the second side wall at least partially define a plant growing chamber. Furthermore, the container includes a lid configured to selectively occlude access to the plant growing chamber. Additionally, the container includes a carrier assembly positioned with the plant growing chamber and movably coupled to the first side wall and the second side wall. Moreover, the container includes a tool coupled to the carrier assembly such that movement of the carrier assembly relative to the first side wall and the second side wall moves the tool within the plant growing chamber.

In another aspect, the present subject matter is directed to an assembly of containers for growing plants. The assembly includes a first container having a bottom wall and a first side wall extending perpendicular to the bottom wall, with the first side wall including a rail. In addition, the first container includes a second side wall extending perpendicular to the bottom wall and parallel to the first side wall such that the bottom wall, the first side wall, and the second side wall at least partially define a plant growing chamber, with the second side wall defining a groove. Furthermore, the assembly includes a second container having a bottom wall and a first side wall extending perpendicular to the bottom wall, with the first side wall including a rail. Additionally, the second container includes a second side wall extending perpendicular to the bottom wall and parallel to the first side wall such that the bottom wall, the first side wall, and the second side wall at least partially define a plant growing chamber, with the second side wall defining a groove. Moreover, the assembly includes a carrier assembly and a tool coupled to the carrier assembly. In this respect, the carrier assembly engages the rails and the grooves of the first and second containers such that the carrier assembly is configured to move along the rails and grooves between the plant growing chambers of the first and second containers.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
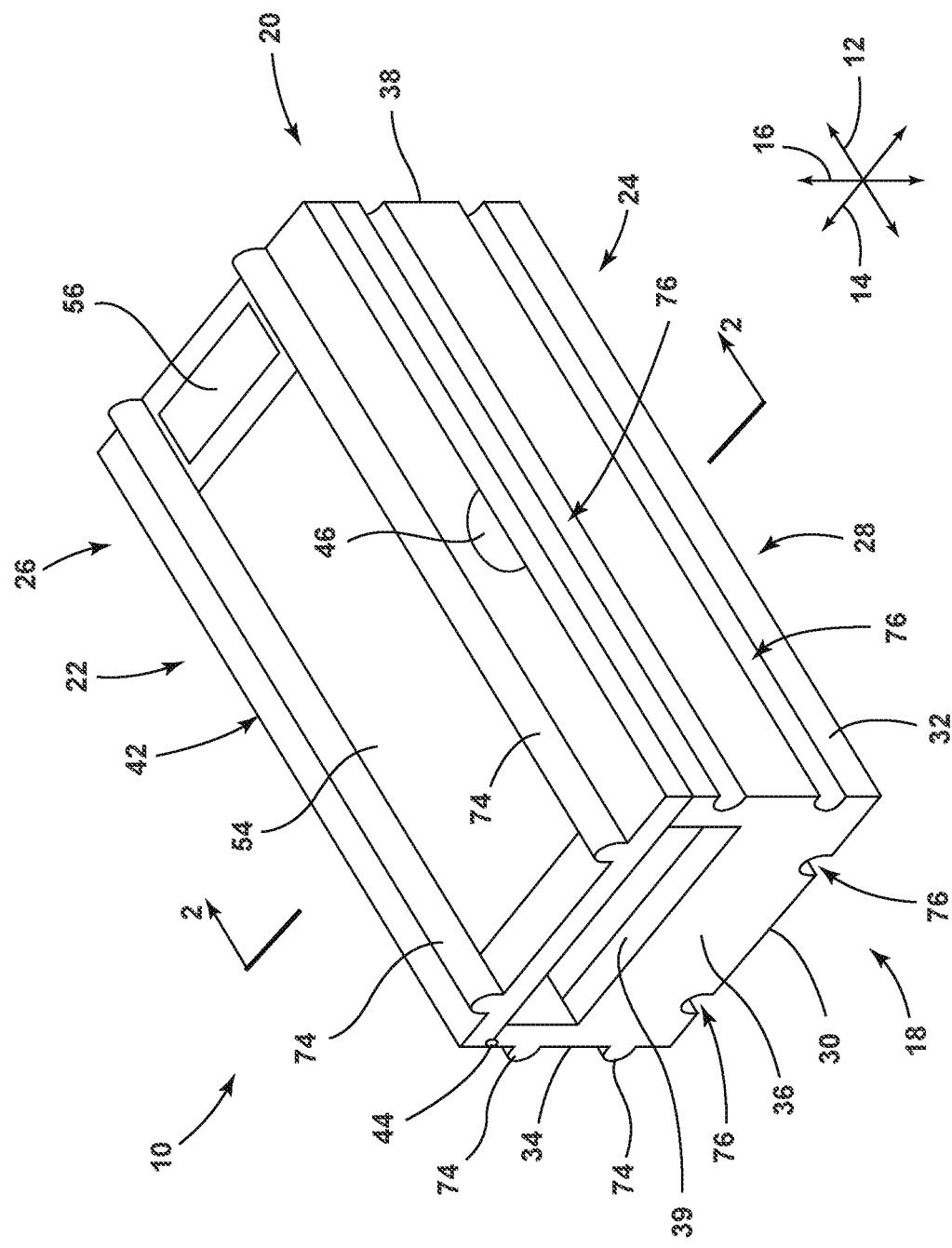
FIG. 1 illustrates a perspective view of one embodiment of a container for growing plants in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a container for growing plants. As will be described below, the container includes a bottom wall, a first side wall extending perpendicular to the bottom wall, and a second side wall extending perpendicular to the bottom wall and parallel to the first side wall. In this respect, the bottom wall, the first side wall, and the second side wall at least partially define a plant growing chamber in which plants (e.g., fruits, vegetables, herbs, etc.) are grown. Furthermore, the container may include a lid configured to selectively occlude access to the plant growing chamber.

Additionally, the container includes a carrier assembly positioned within the plant growing chamber. In general, the carrier assembly is configured to move a tool (e.g., a dispensing tool, a manipulation tool, imaging device, etc.) within the plant growing chamber. Specifically, in several embodiments, the first side wall includes a rail extending inward from its inner surface into the plant growing chamber. Moreover, in such embodiments, the second side wall defines a groove extending outward from its inner surface away from the plant growing chamber. In this respect, the carrier assembly may be configured to move along the rail and groove to move the tool within the plant growing chamber. For example, in some embodiments, the carrier assembly may include a plurality of wheels that roll along the rail and within the groove to facilitate such movement.

The carrier assembly improves the operation of the container. More specifically, the tool coupled to the carrier assembly may be configured to perform one or more operations on the plants and/or growing substance present within the plant growing chamber. For example, such operation may include dispensing an agricultural product (e.g., seeding, fertilizing, etc.), manipulating plants (e.g., harvesting, removing diseased portions, etc.), capturing images, and/or the like. As indicated above, the carrier assembly is configured to move relative to the first and second side walls of the container (e.g., along the rail and groove), thereby moving the tool within the plant growing chamber. This movement, in turn, allows the tool to automatically perform operations the plants and/or growing substance at various locations within the plant growing chamber. Such automatic tool movement allows for the growing of plants within the container with minimal user oversight and without the need for any specialized agricultural knowledge.

Figure 2:
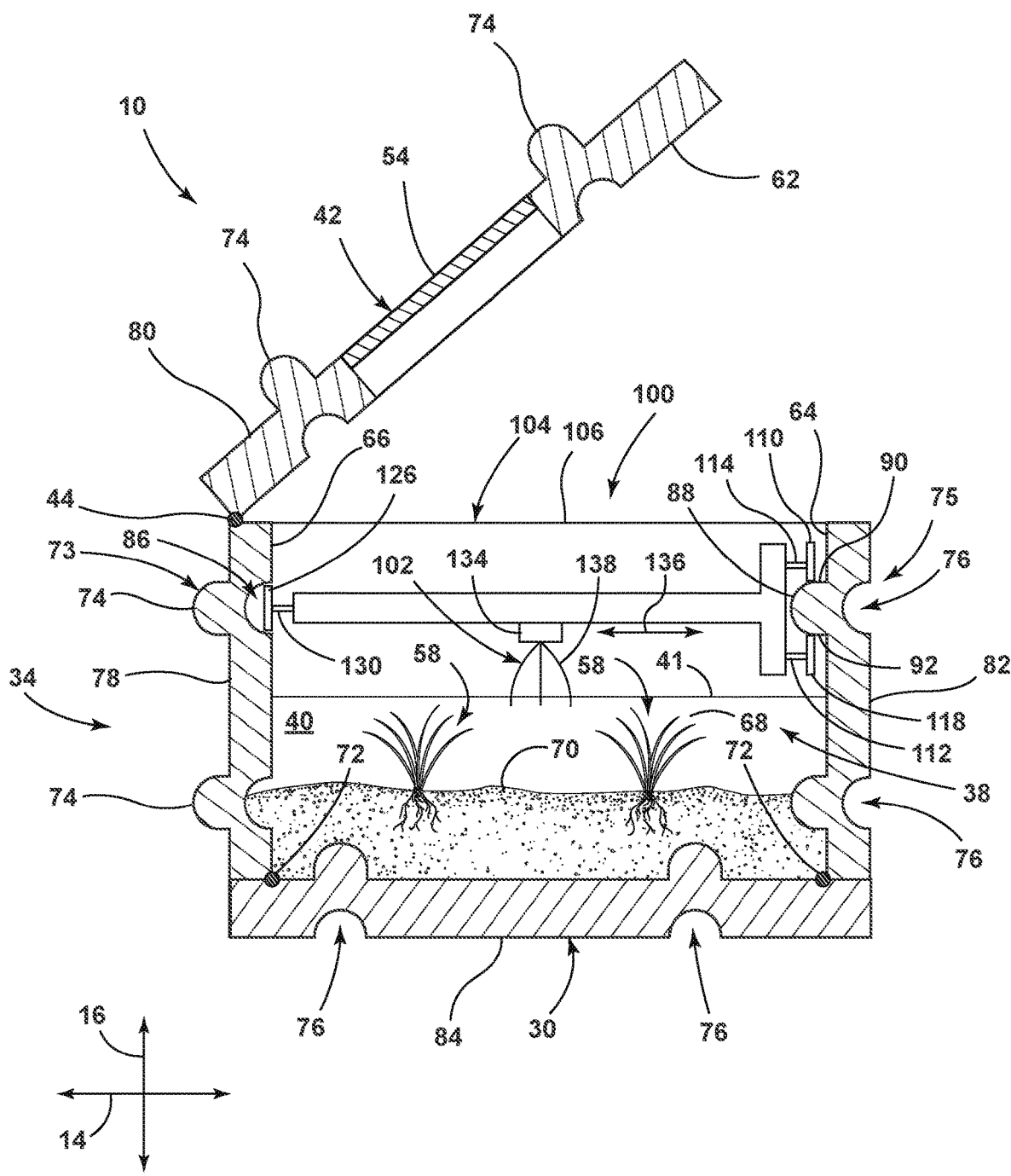
FIG. 2 illustrates a cross-sectional view of the container taken generally about Line 2-2 in FIG. 1.

Referring now to the drawings, FIGS. 1 and 2 illustrate differing views of one embodiment of a container 10 for growing plants. Specifically, FIG. 1 illustrates a perspective view of the container 10. Furthermore, FIG. 2 illustrates a cross-sectional view of the container 10 taken generally about Line 2-2 in FIG. 1. As will be described below, the container 10 is a self-contained apparatus configured to grow plants (e.g., vegetables, fruits, peppers, medicinal herbs, etc.) therein and protect such plants from harsh environments.

As shown in FIG. 1, the container 10 defines a longitudinal direction 12, a transverse direction 14 orthogonal to the longitudinal direction 12, and a vertical direction 16 orthogonal to the longitudinal and transverse directions 12, 14. Specifically, the container 10 extends in the longitudinal direction 12 between a first end 18 of the container 10 and a second end 20 of the container 10. Moreover, the container 10 extends in the transverse direction 14 between a first side 22 of the container 10 and a second side 24 of the container 10. Additionally, the container 10 extends in the vertical direction 16 between a top end 26 of the container 10 and a bottom end 28 of the container 10.

Furthermore, as shown, the container 10 includes various walls. Specifically, in several embodiments, the container 10 includes a bottom wall 30 positioned adjacent to the bottom end 28 of the container 10. The container 10 also includes a first side wall 32 positioned adjacent to its first side 22 and extending perpendicular to the bottom wall 30. In addition, the container 10 includes a second side wall 34 positioned adjacent to its second side 24 and extending perpendicular to the bottom wall 30 and parallel to the first side wall 32. As such, the first and second side walls 32, 34 are generally spaced apart in the transverse direction 14. Moreover, in some embodiments, the container 10 includes third and fourth side walls 36, 38 respectively positioned adjacent to its first and second ends 18, 20. In this respect, the third and fourth side walls 36, 38 are positioned perpendicular to the bottom wall 30 and the first and second side walls 32, 34. Additionally, the third and fourth side walls 36, 38 are parallel to each other and spaced apart in the longitudinal direction 12. In one embodiment, the third and fourth side walls 36, 38 may be shorter in the vertical direction 16 than the first and second side walls 32, 34, thereby providing an access opening. Alternatively, the first, second, third, and fourth side walls 32, 34, 36, 38 may all have the same height in the vertical direction 16 as shown in FIG. 1. As will be described below, the various walls 30, 32, 34, 36, 38 of the container 10 define a plant growing chamber 40 (FIG. 2) in which the plants are grown.

As used herein, two components are perpendicular when oriented at an angle of ninety degrees plus or minus ten degrees. In addition, two components are parallel when oriented at an angle of zero degrees plus or minus ten degrees.

In some embodiments, the various walls 30, 32, 34, 36, 38 of the container 10 may be of the same shape and size such that the container 10 defines a square cube-like shape. Such a configuration generally reduces the manufacturing cost of the container 10. However, in alternative embodiments, the various walls 30, 32, 34, 36, 38 may have any other suitable shape and/or size.

In FIGS. 1 and 2 and as described above, specific side walls of the container 10 are identified as the first, second, third, and fourth side walls 32, 34, 36, 38. This is for illustrative purposes only. As such, the first, second, third, and fourth side walls 32, 34, 36, 38 may refer to any other suitable side walls of the container 10.

Moreover, the container 10 includes a lid 42 positioned adjacent to its top end 26. In general, the lid 42 is configured to selectively occlude access to the plant growing chamber 40. Specifically, the lid 42 may be moveable between a closed position (e.g., as shown in FIG. 1) at which access to the plant growing chamber 40 is occluded and an opened position (e.g., as shown in FIG. 2) at which access to the plant growing chamber 40 is occluded. In this respect, as shown in FIG. 1, the lid 42 may generally be parallel to the bottom wall 30 when at the closed position. As such, in several embodiments, the lid 42 may be pivotably coupled to the top end of one of the side walls 32, 34, 36, 38 via a hinge 44. For example, in the illustrated embodiment, the lid 42 may be pivotably coupled to the top end of the first side wall 32 via the hinge 44. In addition, in some embodiments, the lid 42 may include a handle 46 that allows a user to move the lid 42 between the closed and opened positions.

Furthermore, in one embodiment, the lid 42 may include a window 54. In general, the window 54 is a transparent portion of the lid 42 that allows light to enter the plant growing chamber 40. Such light may, in turn, allow the plants within the plant growing chamber 40 to grow and/or allow a user to view the plants growing chamber 40 while the lid 42 is at the closed position. However, in alternative embodiments, the lid 42 may be entirely opaque. Moreover, a window could be integrated into any one of the walls 30, 32, 34, 36, 38 in addition to or lieu of the window 54 in the lid 42.

Additionally, in one embodiment, the lid 42 may also include a user interface 56. In general, the user interface 56 may be configured to provide feedback associated with plant growing chamber (e.g., temperature, humidity, etc.) or the plants therein (e.g., their health, readiness to harvest, etc.) to the user. As such, the user interface 56 may include one or more feedback devices (not shown), such as display screens, speakers, warning lights, and/or the like, which are configured to provide such feedback to the operator. Moreover, some embodiments of the user interface 56 may include one or more input devices, such as touchscreens, keypads, touchpads, knobs, buttons, sliders, switches, microphones, and/or the like, which are configured to receive inputs from the user (e.g., to adjust the parameters of the crop growing chamber 40). Alternatively, the user interface 56 may be positioned at any other suitable location on the container 10 (e.g., on one of the walls 32, 34, 36, 38) or remote from the container 10. For example, when several containers are stacked together as will be described below, there may be a single user interface 56 for the several containers.

As mentioned above and shown in FIG. 2, the container 10 defines the plant growing chamber 40 in which one or more plants 58 are grown. In general, the bottom wall 30 and the first, second, third, and fourth side walls 32, 34, 36, 38 of the container 10 may define the plant growing chamber 40. Specifically, in several embodiments, the plant growing chamber 40 is defined in the vertical direction 16 between an inner surface 60 of the bottom wall 30 and an inner surface 62 of the lid 42 (when the lid 42 is at the closed position). Furthermore, in such embodiments, the plant growing chamber 40 is defined in the transverse direction 14 between an inner surface 64 of the first side wall 32 and an inner surface 66 of the second side wall 34. Additionally, in such embodiments, the plant growing chamber 40 is defined in the longitudinal direction 12 between an inner surface (not shown) of the third side wall 36 (FIG. 1) and an inner surface 68 of the fourth side wall 38.

The plant growing chamber 40 may be configured to contain any suitable substance(s) or material(s) that facilitate the growth of the plants 58 therein. For example, in the illustrated embodiment, the plant growing chamber 40 includes a growing substance 70, such as soil, sawmill, water (e.g., in the case of hydroponic growing of the plants 58), and/or the like.

In addition, the various walls 30, 32, 34, 36, 38 and the lid 42 may be collapsible to facilitate transportation of the container 10 prior to use. For example, the walls 30, 32, 34, 36, 38 and the lid 42 may be collapsed such that the container 10 is flat for transportation to the site where the container 10 will be used to grow plants. Once at the site, the walls 30, 32, 34, 36, 38 and the lid 42 may be moved to their assembled positions (e.g., as shown in FIGS. 1 and 2) such that the plant growing chamber 40 is defined therein. As such, in some embodiments, the container 10 may include joints 72 positioned between the walls 30, 32, 34, 36, 38 that permit movement of the walls 30, 32, 34, 36, 38 between the assembled and collapsed positions.

As shown in FIGS. 1 and 2, in several embodiments, at least one of the walls 30, 32, 34, 36, 38 or the lid 42 of container 10 includes one or more outer rails 74. Furthermore, at least another of the walls 30, 32, 34, 36, 38 or the lid 42 of container 10 defines one or more outer grooves 76. As will be described below, the outer rail(s) 74 of a given container are configured to be received within the outer groove(s) 76 of a first adjacent container. Similarly, the outer groove(s) 76 of the given container is configured to receive the outer rail(s) 74 of a second adjacent container. In this respect, the outer rail(s) 74 and the outer groove(s) 76 allow adjacent containers to be removably coupled together in an interlocked or puzzle-like manner, thereby facilitating horizontal and/or vertical stacking of the containers.

Any suitable wall(s) of the container 10 may include the outer rail(s) 74 and any other suitable wall(s) of the container 10 may define the outer groove(s) 76. For example, in the illustrated embodiment, the first side wall 32 includes a first pair of the outer grooves 76 and the second side wall 34 defines a first pair of outer rails 74. Moreover, in the illustrated embodiment, the lid 42 includes a second pair of the outer rails 74 and the bottom wall 30 defines a second pair of outer grooves 76. As such, the wall(s)/lid including the outer rail(s) 74 may be parallel to the wall(s)/lid defining the outer groove(s) 76.

The outer rail(s) 74 may correspond to any elongated projection extending outward from the outer surface of one of the walls 30, 32, 34, 36, 38 or the lid 42 of the container 10. For example, in the illustrated embodiment, the outer rails 74 extend outward from an outer surface 78 of the second side wall 34 and an outer surface 80 of the lid 42 away from the plant growing chamber 40. Moreover, in the illustrated embodiment, the outer rails 74 extend along the entire length of the second side wall 34 and the lid 42. However, in alternative embodiments, the outer rails 74 may extend along only a portion of the length of the corresponding walls/lid.

Additionally, the outer groove(s) 76 may correspond to any elongated cavity or slot extending inward from the outer surface of another of the walls 30, 32, 34, 36, 38 or the lid 42 of the container 10. For example, in the illustrated embodiment, the outer grooves 76 extend inward from an outer surface 82 of the first side wall 32 and an outer surface 84 of the bottom wall 30 toward the plant growing chamber 40. Furthermore, in the illustrated embodiment, the outer grooves 76 extend along the entire length of the first side wall 32 and the bottom wall 30. However, in alternative embodiments, the outer grooves 76 may extend along only a portion of the length of the corresponding walls/lid.

As mentioned above, the outer groove(s) 76 of one container is configured to receive the outer rail(s) 74 of another container. In this respect, the outer rail(s) 74 and the outer groove(s) 76 generally define complementary cross-sectional shapes. For example, in the illustrated embodiment, the outer rail(s) 74 and the outer groove(s) 76 define complementary curved or tapered cross-sectional shapes. Curved/tapered cross-sectional shapes (e.g., such as the illustrated semicircular cross-sectional shape) provide clearance for easy insertion of the outer rail(s) 74 into the outer groove(s) 76. However, in alternative embodiments, the outer rail(s) 74 and the outer groove(s) 76 may define any other suitable cross-sectional shapes.

Moreover, the container 10 may include any suitable number of outer rails 74 and outer grooves 76. For example, in the illustrated embodiment, the container 10 includes two outer rails 74 on the second side wall 34 and two outer rails 74 on the lid 42. Moreover, in the illustrated embodiment, the container 10 includes two outer grooves 76 defined by the first side wall 32 and two outer grooves 76 defined by the bottom wall 30. However, in alternative embodiments, the container 10 may include any other suitable number of outer rails 74 and/or outer grooves 76. Furthermore, the outer rails 74 and/or outer grooves 76 may be present on any other suitable walls and/or number of walls.

Furthermore, in several embodiments, the first wall 32 includes an inner rail 88. Specifically, in such embodiments, the inner rail 88 extends inward from the inner surface 64 of the first side wall 32 into the plant growing chamber 40. In this respect, the inner rail 88 may correspond to any elongated projection extending inward from the inner surface 64 of one of the first side wall 32 and having a top surface 90 and a bottom surface 92 along which a wheel(s) can roll. Moreover, in some embodiments, the inner rail 88 extends along the entire length of the first side wall 32. However, in alternative embodiments, the inner rail 88 may extend along only a portion of the length of the first side wall 32.

Additionally, in several embodiments, the second wall 34 defines an inner groove 86. Specifically, in such embodiments, the inner groove 86 extends outward from the inner surface 66 of the second side wall 34 away from the plant growing chamber 40 toward to the outer surface 78. In this respect, the inner groove 86 may correspond to any elongated cavity or slot extending outward from the inner surface 66 of one of the second side wall 34 in which a wheel(s) can roll. Moreover, in some embodiments, the inner groove 86 extends along the entire length of the second side wall 34. However, in alternative embodiments, the inner groove 86 may extend along only a portion of the length of the second side wall 34.

In general, the inner groove 86 and the inner rail 88 are positioned at elevated positions within the container 10. Specifically, in several embodiments, the inner groove 86 and the inner rail 88 are positioned adjacent to the top end 26 of the container 10. Such positioning locates the inner groove 86 and the inner rail 88 above the plants 58 and top surface of the growing substance 70 in the vertical direction 16. Additionally, in some embodiments, the inner groove 86 and the inner rail 88 may be positioned above the top ends 41 of the third and fourth side walls 36, 38.

In some embodiments, the inner groove 86 and the inner rail 88 may be formed by arcuate portions 73, 75 of the first and second side walls 32, 34, respectively. More specifically, in such embodiments, the first side wall 32 may include an arcuate portion 73 extending inward into the plant growing chamber 40. As such, the arcuate portion 73 forms the inner rail 88 and defines one of the outer grooves 76. Similarly, the second side wall 34 may include an arcuate portion 75 extending outward away the plant growing chamber 40. In this respect, the arcuate portion 75 defines the inner groove 86 and forms one of the outer rails 74. Thus, the arcuate portions 73, 75 allow the first and second side walls 32, 34 to form the various inner and outer rails and grooves while maintain a constant wall thickness in the transverse direction 14, thereby reducing manufacturing cost. Furthermore, in one embodiment, some or all of the outer rails and/or grooves 74, 76 may be formed by similar arcuate wall portions to maintain a constant wall thickness such that the container 10 includes additional inner rails and grooves.

Moreover, as shown in FIG. 2, the container 10 includes a carrier assembly 100 positioned within the plant growing chamber 40. In general, the carrier assembly 100 is configured to support and move a tool 102 within the chamber 40. Such movement of the carrier assembly 100, in turn, allows the tool 102 to perform an operation(s) (e.g., seeding, fertilizing, harvesting, etc.) at various locations within the plant growing chamber 40. Specifically, in several embodiments, the carrier assembly 100 is movably coupled to the first and second walls 32, 34. In this respect, the carrier assembly 100 may move relative to the first and second side walls 32, 34 within the plant growing chamber 40 (e.g., in the longitudinal direction 12). For example, as will be described below, in some embodiments, the carrier assembly 100 is configured to roll along the inner rail 88 of the first side wall 32 and the inner groove 86 of the second side wall 34.

Figure 3:
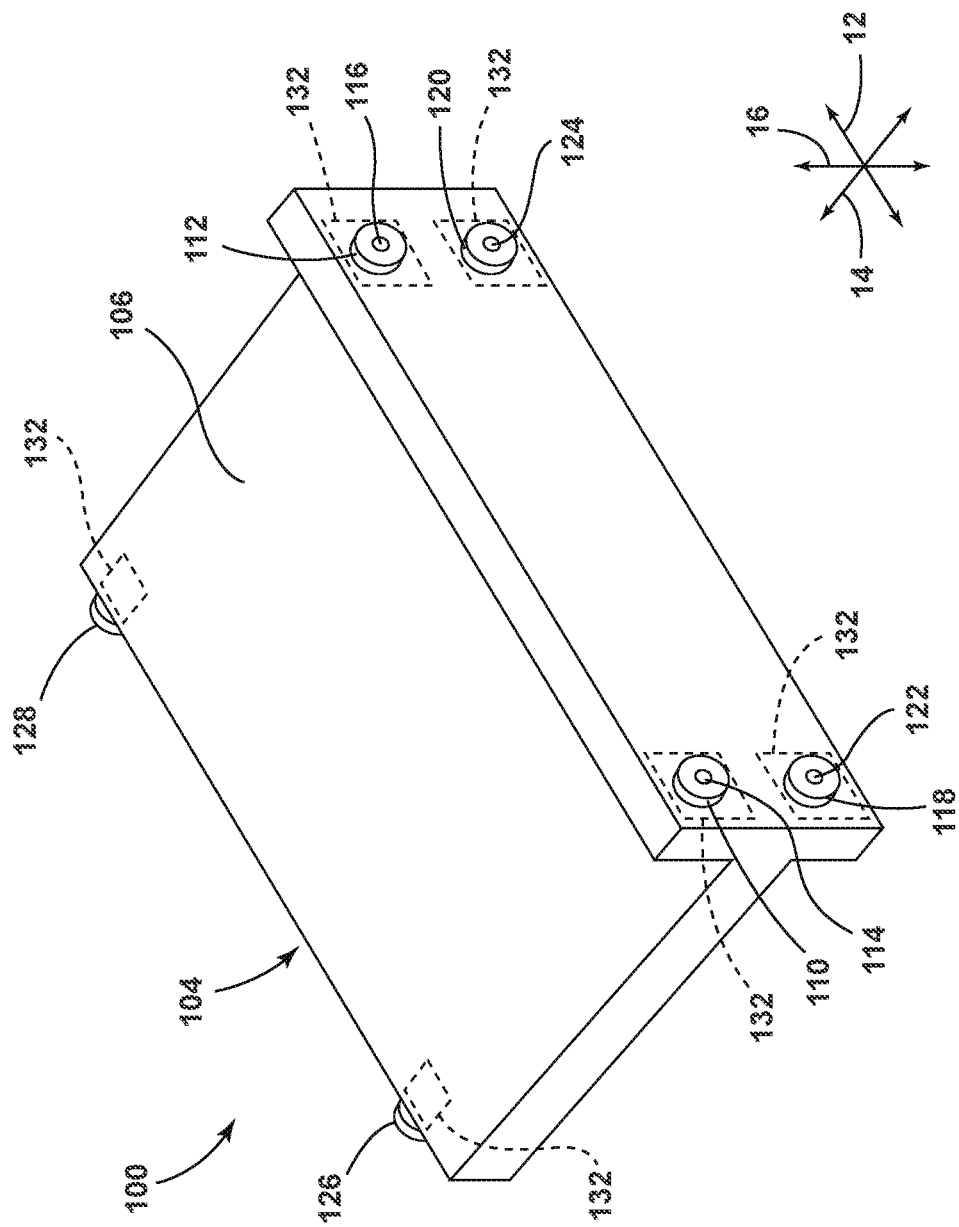
FIG. 3 illustrates a perspective view of one embodiment of a carrier assembly in accordance with aspects of the present subject matter.

FIGS. 2 and 3 illustrate one embodiment of the carrier assembly 100. Specifically, FIG. 2 illustrates a cross-sectional view of the container 10, depicting the carrier assembly 100 positioned therein. Additionally, FIG. 3 illustrates a perspective view of the carrier assembly 100 removed from the container 10.

As shown, the carrier assembly 100 includes a body 104. In general, the body 104 is configured to support the tool 102 at a suspended position within plant growing chamber 40 (e.g., above the plants 58 and top surface of the growing substance 70 in the vertical direction 16). In this respect, the body 102 generally extends between the first and second side walls 32, 34 in the transverse direction 14. Thus, the carrier assembly 100 may correspond to any suitable structure, such as an arm(s), a beam(s), a plate(s), and/or the like.

Furthermore, the carrier assembly 100 may include a plurality of wheels rotatably coupled to the arm 104. In general, the wheels are configured to engage the inner rail 88 and the inner groove 86. Thus, the wheels may roll along the inner rail 88 and the inner groove 86, thereby allowing the carrier assembly 100 to move within the plant growing chamber 40 relative to the first and second walls 32, 34.

For example, as shown in FIG. 3, in the illustrated embodiment, the carrier assembly 100 includes six wheels. Specifically, in the illustrated embodiment, the carrier assembly 100 includes first and second wheels 110, 112 that are spaced apart from each other in the longitudinal direction 12 and rotatably coupled to the body 104 via axles 114, 116. The first and second wheels 110, 112 are positioned above the inner rail 88 in the vertical direction 16. Thus, the first and second wheels 110, 112 are configured to roll along the top surface 90 of the inner rail 88, thereby movably supporting the carrier assembly 100 relative to the inner rail 88. Additionally, the illustrated embodiment, the carrier assembly 100 includes third and fourth wheels 118, 120 that are spaced apart from each other in the longitudinal direction 12 and rotatably coupled to the body 104 via axles 122, 124. The third and fourth wheels 118, 120 are positioned below the inner rail 88 and the first and second wheels 110, 112 in the vertical direction 16. Thus, the third and fourth wheels 118, 120 are configured to roll along the bottom surface 92 of the inner rail 88. Moreover, in the illustrated embodiment, the carrier assembly 100 includes fifth and sixth wheels 126, 128 that are spaced apart from each other in the longitudinal direction 12 and rotatably coupled to the body 104 via an axle 130 (FIG. 2) and an unillustrated axle. The fifth and sixth wheels 126, 128 are positioned within the inner groove 86. Thus, the first and second wheels 110, 112 are configured to roll within the inner groove 86, thereby movably supporting the carrier assembly 100 relative to the inner groove 86. However, in alternative embodiments, the carrier assembly 100 may have any other suitable number and/or configuration of wheels.

In several embodiments, the wheels 110, 112, 118, 120, 126, 128 are driven. Specifically, in such embodiments, each wheel 110, 112, 118, 120, 126, 128 may include a corresponding electric motor 132. As such, each electric motor 132 is configured to rotationally drive one of the wheels 110, 112, 118, 120, 126, 128 via the corresponding axle 114, 116, 122, 124, 130, respectively. In this respect, the electric motor 132 may rotate the wheels 110, 112, 118, 120, 126, 128, thereby moving the carrier assembly 100 along the inner rail 88 and the inner groove 86. Alternatively, the wheels 110, 112, 118, 120, 126, 128 may be driven in any other suitable manner. Moreover, in one embodiment, only a portion of the wheels 110, 112, 118, 120, 126, 128 may be driven and the other wheels 110, 112, 118, 120, 126, 128 may be undriven. However, in other embodiments, the all of the wheels 110, 112, 118, 120, 126, 128 may be unpowered. In such other embodiments, a pulley (not shown) coupled to the carrier assembly 100 and an associated cable (not shown) may be used to move the carrier assembly 100 relative to the first and second side walls 32, 34.

In addition, the carrier assembly 100 may include a tool holder 134. In general, the tool holder 134 removably couples to or otherwise receives the tool 102 being supported by the carrier assembly 100. In this respect, the tool holder 134 may correspond to any suitable structure, such as a chuck, a quick-disconnect coupling, or the like. In some embodiments, the tool holder 134 may be configured to move relative to body 104 of the carrier assembly 100, such as in the transverse direction 14 (e.g., as indicated by arrow 136) between the first and second side walls 32, 34. The movement of the tool holder 134 relative to the body 104 combined with the movement of the carrier assembly 100 relative to the first and second side walls 32, 34 may allow to the tool 102 to be positioned at various positions within a horizontal plane defined by the lateral and transverse directions 12, 14 in the plant growing chamber 40.

Figure 4:
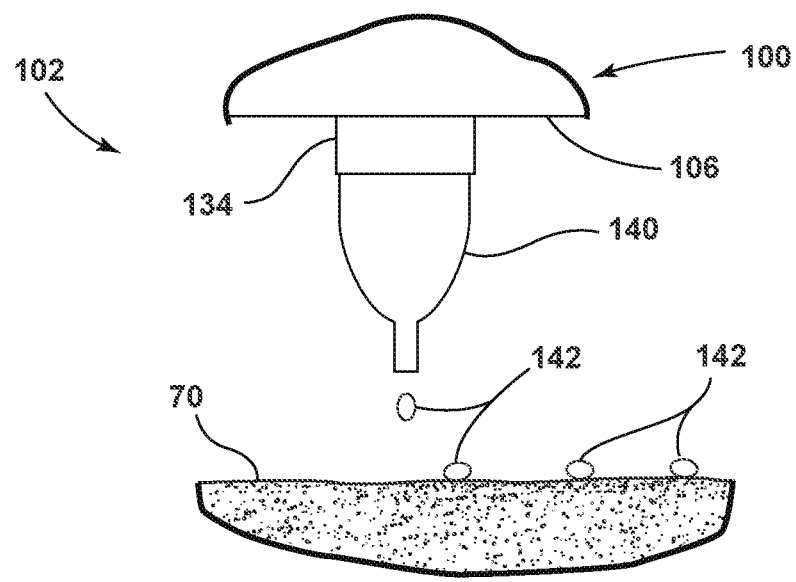
FIG. 4 illustrates a front view of one embodiment of a tool coupled to a carrier assembly in accordance with aspects of the present subject matter.
Figure 5:
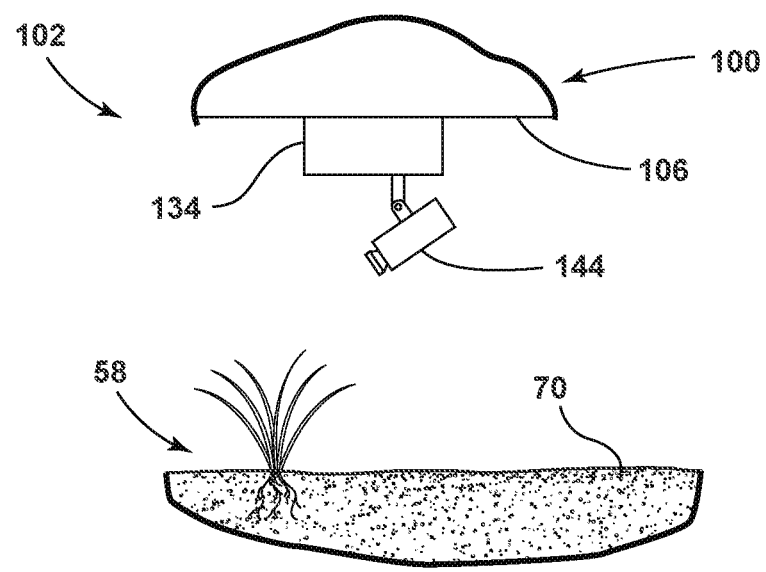
FIG. 5 illustrates a front view of another embodiment of a tool coupled to a carrier assembly in accordance with aspects of the present subject matter.

The tool 102 supported by the carrier assembly 100 may correspond to any suitable tool configured to perform any suitable operation. For example, in the embodiment shown in FIG. 2, the tool 102 corresponds to a manipulating tool 138 (e.g., a claw-like tool) configured to manipulate the plants 58 within the plant growing chamber 40. Such manipulation may include harvesting the fruits, vegetables, herbs, or the like from the plants 58, removing dead/diseased portions from the plants 58, and/or the like. In the embodiment shown in FIG. 4, the tool 102 corresponds to a dispensing tool 140 configured to dispense an agricultural product 142, such as seeds, fertilizer, and/or the like, within the plant growing chamber 40. Alternatively, in the embodiment shown in FIG. 5, the tool 102 corresponds to an imaging device 144 (e.g., a camera) configured to capture image data of the plant growing chamber 40 (e.g., of the plants 58). Such image data may be used to monitor the plants 58 and/or the conditions within of the plant growing chamber 40 and/or determine operations that need to be performed.

Additionally, the container 10 may include any other components to support of the growth of the plants 58 within the plant growing chamber 40. For example, container 10 may include lighting devices, heating elements, fans, irrigation components, drainage components, and/or the like. Furthermore, the container 10 may include a source of power, such a solar panel, battery, a hook-up to an external source of electricity (e.g., an electric plug), or the like to power such components.

Moreover, in some embodiments, the bottom wall 30, first side wall 32, the second side wall 34, the third side wall 36, the fourth side wall 38, and/or the lid 42 may be formed from a compostable, biodegradable material, such as a compressed biomass and bio-glue composite material. Construction of the container 10 using a biodegradable material permits easy disposal of the container 10 at the end of its life. Specifically, the electronics (e.g., cameras, lights, etc.) can be removed from the container 10 and the container 10 can then be buried or composted for eventual decomposition. The walls 30, 32, 34, 36, 38 and/or the lid 42 may also be 3D printed or otherwise additively formed using coarse natural materials. However, in alternative embodiment, the container 10 may be formed from any other suitable material(s) and/or formed in any other suitable manner.

In addition, the container 10 may be used in a variety of ways to grow and transport crops (e.g., fruits and vegetables) or other plants. For example, the container 10 may be part of a community garden or other small scale urban farming operation that allows people grow plants remotely. Specifically, the container 10 can be stacked vertically and/or horizontally with other containers to increase growing capacity without the large, fixed costs of typical larger scale urban farming operations (e.g., there is no need for a greenhouse). Furthermore, the container 10 may be used to grow and transport high value crops (e.g., grapes, peppers, etc.) to restaurants or stores. Moreover, the container 10 may be used to grow and transport fresh crops to disaster areas or other regions where food is scarce. Additionally, the container 10 could be placed on the roof of a hospital or medical research center and used to grow medicinal herbs. Moreover, the container 10 can be assembled and used on an apartment balcony (e.g., in a city) or in a yard (e.g., adjacent to a house). In addition, the container 10 can be used in a manufacturing facility for air quality improvement and food production for the employees that work there. However, the container 10 may be assembled and/or used in any other suitable location.

The container 10 may be stackable horizontally and/or vertically. More specifically, as described above, the container 10 include a plurality of outer rails 74 and a plurality of outer grooves 76. In this respect, the outer rails 74 of a given container 10 may be received within the outer grooves of a first adjacent container. Similarly, the outer grooves 76 of the given container may receive the outer rails of a second adjacent container.

Figure 6:
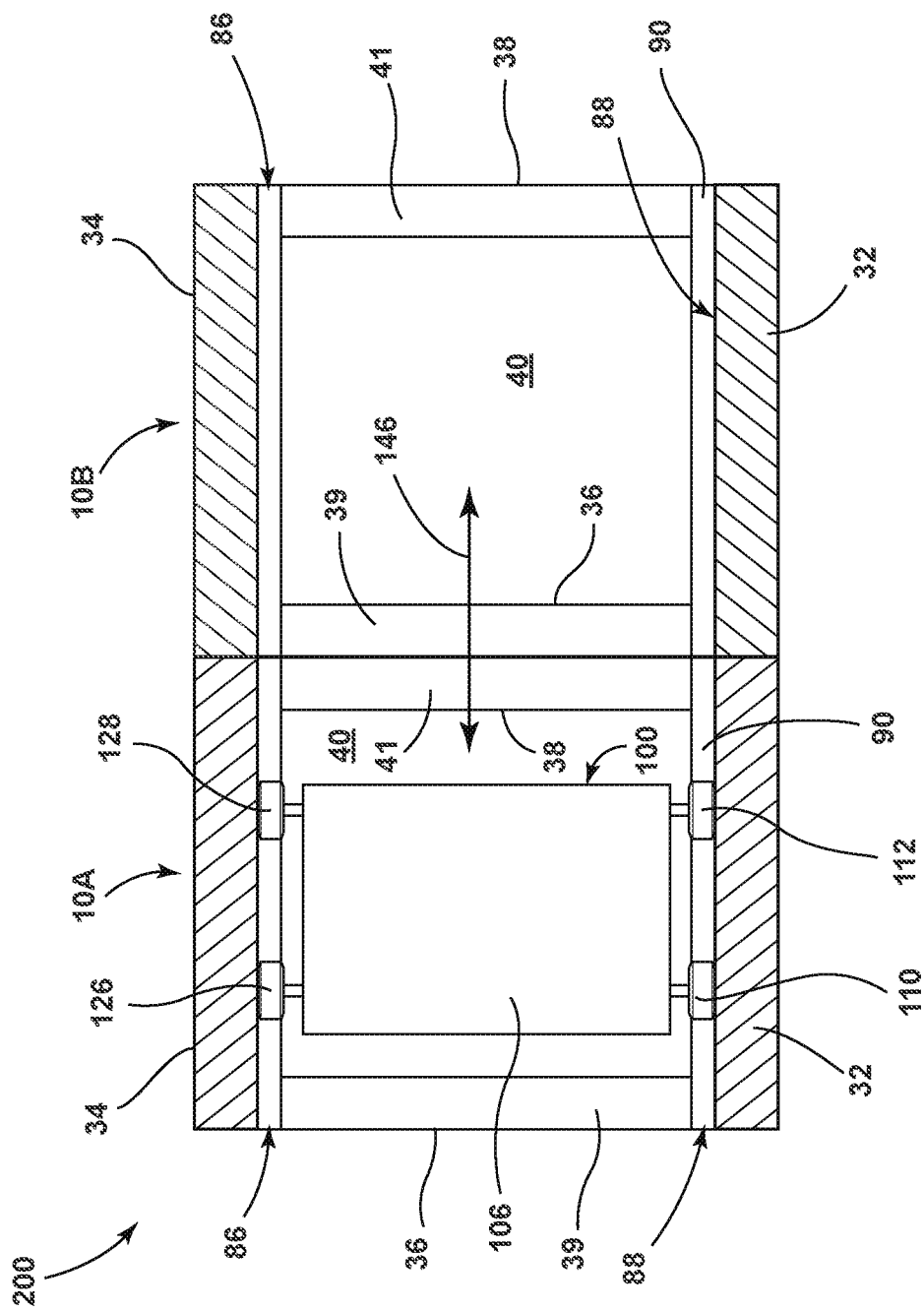
FIG. 6 illustrates a cross-sectional top view of an assembly of containers in accordance with aspects of the present subject matter, particularly illustrating a carrier assembly moving between the containers of the assembly.

FIG. 6 illustrates an assembly 100 of containers for growing plants. More specifically, as shown, the assembly 100 includes a first container 10A and a second container 10B. The first and second containers 10A, 10B are stacked together horizontally such that the fourth side wall 38 of the first container 10A is in contact with the third side wall 36 of the second container 10B. Although only two containers are shown stacked horizontally in FIG. 6, the assembly 100 may include any other suitable number of containers stacked horizontally and/or vertically.

In several embodiments, the carrier assembly 100 may be configured to move between the plant growing chambers 40 of different containers when such containers are stacked vertically or horizontally. More specifically, as shown, the top end 41 of the fourth side wall 38 of the first container 10A and the top end 39 of the third side wall 36 of the second container 10B are positioned below the inner rails 88 and the inner grooves 86 of the containers 10A, 10B. Thus, an opening is defined between the containers 10A, 10B that allows the carrier assembly 100 to move between the first and second containers 10A, 10B. In this respect, the inner rail 88 of the first container 10A and the inner rail 88 of the second container 10B may form a single continuous rail along which the wheels 110, 112, 118, 120 can roll. Similarly, the inner groove 86 of the first container 10A and the inner groove 86 of the second container 10B may form a single continuous groove through which the wheels 126, 127 can roll. In this respect, the carrier assembly 100 can move along inner rails 88 and the inner grooves 86 between the plant growing chambers 40 of the first and second containers 10A, 10B. For example, after the tool 102 has finished performing an operation in the plant growing chamber 40 of the first container 10A, the carrier assembly 100 may roll along the inner rails 88 and the inner grooves 86 above the top end 41 of the fourth side wall 38 of the first container 10A and the top end 39 of the third side wall 36 of the second container 10B into the plant growing chamber 40 of the second container 10B. Thereafter, the tool 102 may perform the operation in the plant growing chamber 40 of the second container 10B. The carrier assembly 100 may move to the plant growing chambers 40 other adjacent horizontally stacked containers in a similar manner.

Alternatively, when the containers are stacked inline (e.g., as shown in FIG. 6), it is not necessary that the containers include the third and fourth side walls 36, 38. Eliminating the third and fourth side walls 36, 38 in such a configuration provides additional clearance for the carrier assembly 100 to move between the containers.

Additionally, the carrier assembly 100 may also move to the plant growing chambers 40 of adjacent vertically stacked containers. For example, the assembly 200 may include an elevator-like device that can raise and lower the carrier assembly between the different rows of vertically stacked containers. Alternatively, the assembly 200 may include inclined rails/grooves at the end of each horizontal row that allows the carrier assembly 100 drop down the next row of containers below using gravity. However, in other embodiments, the carrier assembly 100 may move to the plant growing chambers 40 adjacent vertically stacked containers in any other suitable manner.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A container for growing plants, the container comprising:
   a bottom wall;
   a first side wall extending perpendicular to the bottom wall;
   a second side wall extending perpendicular to the bottom wall and parallel to the first side wall such that the bottom wall, the first side wall, and the second side wall at least partially define a plant growing chamber;
   a lid configured to selectively occlude access to the plant growing chamber;
   a carrier assembly positioned with the plant growing chamber and movably coupled to the first side wall and the second side wall;
   a tool coupled to the carrier assembly such that movement of the carrier assembly relative to the first side wall and the second side wall moves the tool within the plant growing chamber; and
   wherein the first side wall includes a rail and the second side wall defines a groove such that the carrier assembly is configured to move along the rail and the groove.

2. The container of claim 1, wherein the rail extends inward from an inner surface of the first side wall into the plant growing chamber and the groove extends outward from an inner surface of the second side wall away from the plant growing chamber.

3. The container of claim 2, wherein:
   the rail corresponds to an inner rail and the groove corresponds to an inner groove,
   the first side wall comprises an arcuate portion forming the inner rail and defining an outer groove, and
   the second side wall comprises an arcuate portion defining the inner groove and forming an outer rail.

4. The container of claim 1, wherein the carrier assembly comprises:
   a body extending between the first side wall and the second side wall; and
   a plurality of wheels rotatably coupled to the tool and configured to engage the rail and the groove.

5. The container of claim 4, wherein the plurality of wheels further comprises:
   first and second wheels positioned above the rail such that the first and second wheels are configured to roll along a top surface of the rail; and
   third and fourth wheels positioned below the rail such that the third and fourth wheels are configured to roll along a bottom surface of the rail.

6. The container of claim 5, wherein the plurality of wheels comprises fifth and sixth wheels positioned within the groove such that the fifth and sixth wheels are configured to roll within the groove.

7. The container of claim 4, wherein the plurality of wheels is driven.

8. The container of claim 4, wherein the carrier assembly further comprises a tool holder removably coupled to the tool, the tool holder movably coupled to the tool such that the tool holder is configured to move along the body between the first side wall and the second side wall.

9. The container of claim 1, wherein the tool is configured to dispense an agricultural product into the plant growing chamber.

10. The container of claim 1, wherein the tool is configured to manipulate a plant present within the plant growing chamber.

11. The container of claim 1, wherein the tool is configured to capture image data depicting the plant growing chamber.

12. The container of claim 1, further comprising:
   a third side wall extending perpendicular to the bottom wall and the first and second side walls; and
   a fourth side wall extending perpendicular to the bottom wall and the first and second side walls and parallel to third side wall.

13. The container of claim 12, wherein a top end of the third side wall and a top end of the fourth side wall are positioned below the rail and the groove in a vertical direction.

14. An assembly of containers for growing plants, the assembly comprising:
   a first container including:
      a bottom wall;
      a first side wall extending perpendicular to the bottom wall, the first side wall including a rail; and
      a second side wall extending perpendicular to the bottom wall and parallel to the first side wall such that the bottom wall, the first side wall, and the second side wall at least partially define a plant growing chamber, the second side wall defining a groove;
   a second container including:
      a bottom wall;
      a first side wall extending perpendicular to the bottom wall, the first side wall including a rail; and
      a second side wall extending perpendicular to the bottom wall and parallel to the first side wall such that the bottom wall, the first side wall, and the second side wall at least partially define a plant growing chamber, the second side wall defining a groove;

a carrier assembly; and a tool coupled to the carrier assembly, wherein the carrier assembly engages the rails and the grooves of the first and second containers such that the carrier assembly is configured to move along the rails and grooves between the plant growing chambers of the first and second containers.

15. The assembly of claim 14, wherein the carrier assembly comprises:

a body extending between the first side walls and the second side walls; and a plurality of wheels rotatably coupled to the tool and configured to engage the rails and the grooves.

16. The assembly of claim 15, wherein the plurality of wheels further comprises:

first and second wheels positioned above the rails such that the first and second wheels are configured to roll along top surfaces of the rails; and third and fourth wheels positioned below the rails such that the third and fourth wheels are configured to roll along bottom surfaces of the rails.

17. The container of claim 16, wherein the plurality of wheels comprises fifth and sixth wheels positioned within the grooves such that the fifth and sixth wheels are configured to roll within the grooves.

18. The assembly of claim 15, wherein the plurality of wheels is driven.

19. The assembly of claim 15, wherein the carrier assembly further comprises a tool holder removably coupled to the tool, the tool holder movably coupled to the tool such that the tool holder is configured to move along the tool between the first side walls and the second side walls.

* * * * *